US005748909A

United States Patent [19]
Nakabayashi

[11] Patent Number: 5,748,909
[45] Date of Patent: May 5, 1998

[54] INTERFACE BOARD AND INSTRUCTION PROCESSING DEVICE WITHOUT A LOCAL CPU

[75] Inventor: Takeo Nakabayashi, Itami, Japan

[73] Assignee: Mitsubishi Denki Kabushiki Kaisha, Tokyo, Japan

[21] Appl. No.: 504,830

[22] Filed: Jul. 20, 1995

[30] Foreign Application Priority Data

Oct. 17, 1994 [JP] Japan .................................. 6-250717

[51] Int. Cl.[6] ...................................................... G06F 13/10
[52] U.S. Cl. ............................................................ 395/280
[58] Field of Search ....................... 364/DIG. 1 MS File, 364/DIG. 2 MS File; 395/280, 281, 282, 821, 822, 823, 824, 825, 826, 827, 840, 882, 376, 885

[56] References Cited

U.S. PATENT DOCUMENTS 5,600,801  2/1997  Parks et al. ............................ 395/282

Primary Examiner—Robert B. Harrell
Attorney, Agent, or Firm—Oblon, Spivak, McClelland, Maier & Neustadt, P.C.

[57] ABSTRACT

An interface board (2a) includes an instruction processing device (11), a board bus (4) and devices (6, 7, 8). The instruction processing device selects instructions provided on an extension bus (3) and provides them to each of the devices. This selection is made on the basis of addresses corresponding to the respective devices, which belong to an address space assigned to the entirety of the interface board (2a). Use of the board bus (4) keeps the extension bus (3) away from effects of data transfer within the interface board (2a), which requires no local CPU and which does not degrade performance of the entire system.

16 Claims, 17 Drawing Sheets

| ADDRESS | INTERNAL BUS 91 | BOARD BUS 4 |
|---|---|---|
| 0h<br>3FFFFh | INACTIVATED | INACTIVATED |
| 40000h<br>41FFFh | ACTIVATED | INACTIVATED |
| 42000h<br>4FFFFh | INACTIVATED | ACTIVATED |
| 50000h<br>FFFFFh | INACTIVATED | INACTIVATED |

INTERFACE BOARD AND INSTRUCTION PROCESSING DEVICE WITHOUT A LOCAL CPU

BACKGROUND OF THE INVENTION

1. Field of the Invention

The present invention relates to an interface board for connecting various kinds of peripheral devices (SCSI equipment, such as hard disks and CD-ROM's, networks, etc.) to a personal computer or a workstation and an instruction processing device constituting the same.

2. Description of the Background Art

Generally, personal computers and workstations have extension slots for connecting with peripheral equipment, through which of memories or hard disks can be extended, CD-ROM's can be added, network and connections and the like can be made. For example, when extending SCSI hard disks, an interface board including SCSI interface is attached to an extension slot and a hard disk is provided through the SCSI interface.

The extension slot is provided with an extension bus, through which the interface board is connected to a CPU in a body of a personal computer or a workstation. The extension slots include the ISA (Industrial Standard Association), the EISA (Extended ISA), MCA (Micro Channel Association), PCI (Peripheral Component Interconnect), SBus, etc.

A. (a-1) First Conventional System

FIG. 18 is a block diagram showing the structure of a conventional interface board 200a. The interface board 200a is connected to a host CPU 1 on a personal computer or a workstation through an extension bus 3.

The interface board 200a includes a board bus 4, which is a bus on the interface board 200a, a local CPU 5, devices 6, 7, 8, and a 2-port RAM 9. The devices 6, 7, 8 are subject to control by the local CPU 5 through the board bus 4. The 2-port RAM 9 is provided to connect the extension bus 3 and the board bus 4, and it is readable and writable from both the host CPU 1 and the local CPU 5.

Next, the operation of the interface board 200a will be described. The host CPU 1 writes into the 2-port RAM 9 various commands corresponding to processes/functions to be performed by the interface board 200a, as well as data to be transmitted, and the like. The local CPU 5 reads the commands and data written in the 2-port RAM 9. Then, the local CPU 5 controls the devices 6, 7, 8 on the basis of the commands and data to execute processes commanded by the host CPU 1.

Furthermore, the local CPU 5 controls the devices 6, 7, 8 to obtain results of the various commands and receive data, etc. and writes them in the 2-port RAM 9. The host CPU 1 reads the results of the commands and the received data, etc. from the 2-port RAM 9 and conducts the processes.

The interface board 200a itself requires the local CPU 5 as described above, which gives rise to problems of requiring a large amount of hardware and of high price accordingly.

(a-2) Second Conventional System

FIG. 19 is a block diagram showing the structure of another conventional interface board 200b. in contrast to the interface board 200a shown in the first conventional art, the interface board 200b has no local CPU 5 so as to solve the problem of the first conventional art.

In the interface board 200b, a board bus 4 is directly connected to an extension bus 3, where the board bus 4 functions as an extended extension bus 3. The devices 6, 7, 8 on the board are directly controlled by a host CPU 1. With such configuration, there is no need of the local CPU 5 and the 2-port RAM 9, and so the problem of the first conventional art is eased.

However, when data is transferred between the device 6 and the device 7, for example, the data transferred only on the interface board 200b is provided on the extension bus 3, too. Accordingly, the second conventional art gives rise to a new problem of incurring degradation in the performance of the entire system including the personal computer or the workstation.

(a-3) Third Conventional System

FIG. 20 is a block diagram showing the structure of still another conventional interface board 200c. The interface board 200c includes an integrated device 10. The device 10 is made by integrating the devices 6, 7, 8 shown in FIG. 18 and FIG. 19 into one, for example.

With such configuration, the local CPU, and also the board bus 4 are not required, and so the problems of the first and second conventional arts are solved. As there is a limit in the integration, however, it is impossible to form an interface board of a large scale over it. If the integration of the device is insufficient, the functions processable on the interface board 200c are also insufficient, so that the functions to be done by the interface board will be assigned to the host CPU 1. Then, the load of the host CPU 1 is increased which gives rise to a problem of degradation of the performance of the entire system.

As has been described above, in the conventional art, the interface board itself requires a local CPU, so that a large amount of hardware is required to increase the price.

In the case of providing no local CPU, it has been a problem that the performance of the entire system is degraded.

SUMMARY OF THE INVENTION

According to a first aspect of the present invention, an interface board comprises: (a) an instruction processing device connected to an extension bus and having, (a-1) an input portion for inputting an instruction provided from the extension bus and corresponding to an address space having first and second portions, (a-2) an operation determination portion for determining to which of the first and the second portion the instruction corresponds to, and (a-3) an operation selection portion for processing the instruction when the instruction corresponds to the first portion and outputting the instruction when the instruction corresponds to the second portion; (b) at least one controlled element having a storage element to which the second portion is assigned and controlled on the basis of the instruction corresponding to the second portion, and (c) a board bus which connects the controlled element and the instruction processing device and for which the instruction processing device functions as a master.

Preferably, according to the interface board of a second aspect of the present invention, the controlled element outputs a READY signal indicating whether or not an access to the storage element included in it is completed to the board bus, the READY signal is transmitted to the extension bus through the operation selection portion, and update of the instruction is conducted after the READY signal indicates completion of the access to the storage element.

Preferably, according to the interface board of a third aspect of the present invention, the instruction processing device further includes (a-4) a latch circuit interposed between the operation selection portion and the board bus, the latch circuit latching the instruction corresponding to the second portion, the operation selection portion provides a false READY signal corresponding to the READY signal to the extension bus when the instruction is latched irrespective of a value taken by the READY signal outputted from the controlled element, and update of the instruction is conducted after the false READY signal indicates completion of an access to the storage element.

Preferably, according to a fourth aspect of the present invention, the interface board further comprises; (d) at least one master means which functions as a master together with the instruction processing device to the board bus, and (e) arbitrating means for arbitrating which of the instruction processing device and the master means is permitted to use the board bus.

Preferably, the interface board of a fifth aspect of the present invention further comprises, (d) at least one master means which functions as a master together with the instruction processing device to the board bus, and the instruction processing device has a function of arbitrating which of the master means and itself is permitted to use the board bus.

Preferably, according to the interface board of the sixth aspect of the present invention, the controlled element generates an interrupt request signal and provides it to the instruction processing device, and the instruction processing device further includes (a-4) interrupt request means for generating a board interrupt request signal on the basis of the interrupt request signal and providing it to the extension bus.

Preferably, according to the interface board of the seventh aspect of the present invention, the controlled element has (b-1) an interrupt factor register for storing an interrupt factor, and the interrupt request signal is generated on the basis of the contents of the interrupt factor register.

The present invention is also directed to an instruction processing device. According to an eighth aspect of the present invention, the instruction processing device comprises: (a) an input portion for inputting an instruction corresponding to an address space having first and second portions, (b) an operation determination portion for determining to which of the first and the second portions the instruction corresponds, and (c) an operation selection portion for processing the instruction when the instruction corresponds to the first portion and outputting the instruction when the instruction corresponds to the second portion.

Preferably, according to the instruction processing device of a ninth aspect of the present invention, the instruction processing device is connected to a board bus to which at least one controlled element is connected, operation of the controlled element is controlled with an instruction corresponding to the second portion through the instruction processing device, the instruction processing device functions as a master to the board bus, at least one master means which functions as a master to the board bus together with the instruction processing device is connected to the board bus, and the instruction processing device has a function for arbitrating which of the master means and itself is permitted to use the board bus.

Preferably, according to the instruction processing device of a tenth aspect of the present invention, the instruction processing device is also connected to an extension bus on which the instruction is provided, the controlled element generates an interrupt request signal and provides it to the instruction processing device, and the instruction processing device further comprises (d) interrupt request means for generating a board interrupt request signal on the basis of the interrupt request signal and providing it to the extension bus.

The interface board according to the first aspect of the present invention does not require a local CPU and uses a board bus.

A large amount of hardware is not required and an interface board of a large scale can be made without degrading the performance of the entirety of the system including the interface board.

In the interface board according to the second aspect of the present invention, the instruction is not updated unless the READY signal indicates completion of an access of the controlled element.

Instructions are sequentially provided to the controlled element without confusion.

In the interface board according to the third aspect of the present invention, the false READY signal falsely indicates completion of an access in the controlled element.

An instruction provided on the extension bus can be processed irrespective of a state of the board bus.

In the interface board according to the fourth and fifth aspects of the present invention, it is arbitrated to which master the use of the board bus is to be permitted.

The board bus is used by only one master even if a plurality of masters for the board bus exist.

In the interface board according to the sixth aspect of the present invention, when an interrupt request occurs in the controlled element, a board interrupt request for the entirety of the interface board is provided to the extension bus.

When an interrupt request occurs in the controlled element on the interface board, an interrupt processing can be conducted for the entire interface board.

In the interface board according to the seventh aspect of the present invention, an interrupt factor can be known by reading the interrupt factor register of the controlled element having its interrupt request signal being activated.

When a board interrupt request signal is detected on the extension bus, an interrupt request signal causing the board interrupt request signal can be specified so as to specify an interrupt factor causing the interrupt request signal.

In the instruction processing device according to the eighth aspect of the present invention, the instruction processing device analyzes an address of an instruction which the device itself receives and controls activation of the board bus according to whether it is an instruction to be processed by itself or it is an instruction to be processed by another device connected to the board bus.

A local CPU is not required and the interface board can be formed using the board bus, wherein a large amount of hardware is not required and the performance of the entire system including the interface board is not deteriorated.

In the instruction processing device according to the ninth aspect of the present invention, it is arbitrated which master is to be permitted to use the board bus.

The board bus is used only by a single master even if a plurality of masters for the board bus exist.

In the instruction processing device according to the tenth aspect of the present invention, when an interrupt request occurs in the controlled element, a board interrupt request is provided to an extension bus.

When the interrupt request occurs in the controlled element connected to the board bus, an interrupt processing can be effected to the entirety of the interface board including the instruction processing device and the controlled element.

Accordingly, it is an object of the present invention to provide an interface board which requires no local CPU and which does not cause degradation in the performance of the entire system, and an instruction processing device constituting it.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing an example of structure of the bus control portion 19a.

FIG. 5 is a diagram illustrating contents of determination of the operation determination portion 35.

FIG. 18 is a block diagram showing the structure of a conventional interface board 200a.

FIG. 20 is a block diagram showing the structure of still another conventional interface board 200c.

DESCRIPTION OF THE PREFERRED EMBODIMENTS

B. (b-1) First Preferred Embodiment

Figure 1:
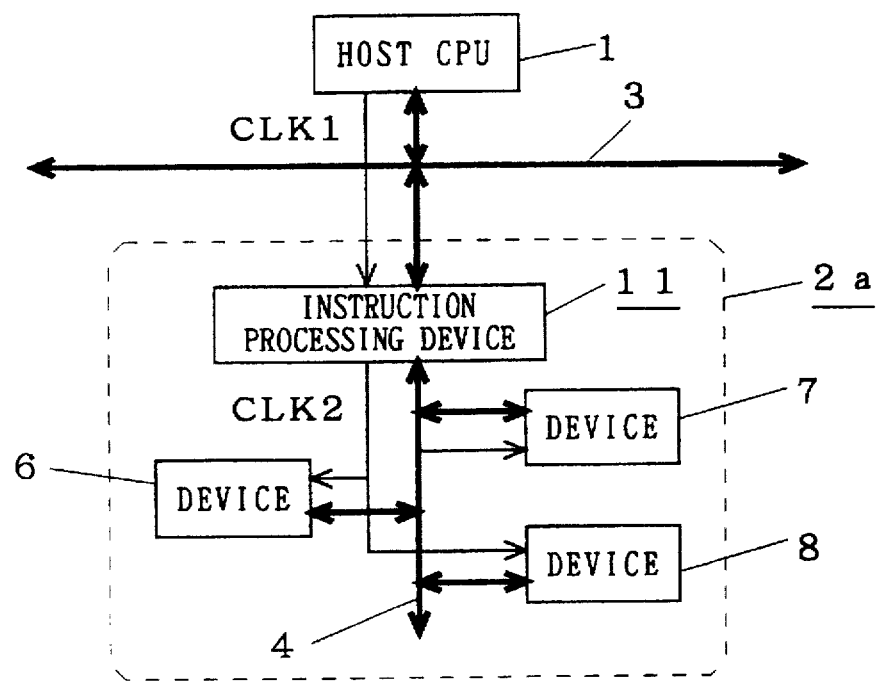
FIG. 1 is a block diagram showing the structure of an interface board 2a according to the first preferred embodiment of the present invention.

FIG. 1 is a block diagram showing the structure of an interface board 2a according to the first preferred embodiment of the present invention. The interface board 2a includes an instruction processing device 11, a board bus 4, and devices 6, 7, 8.

Figure 2:
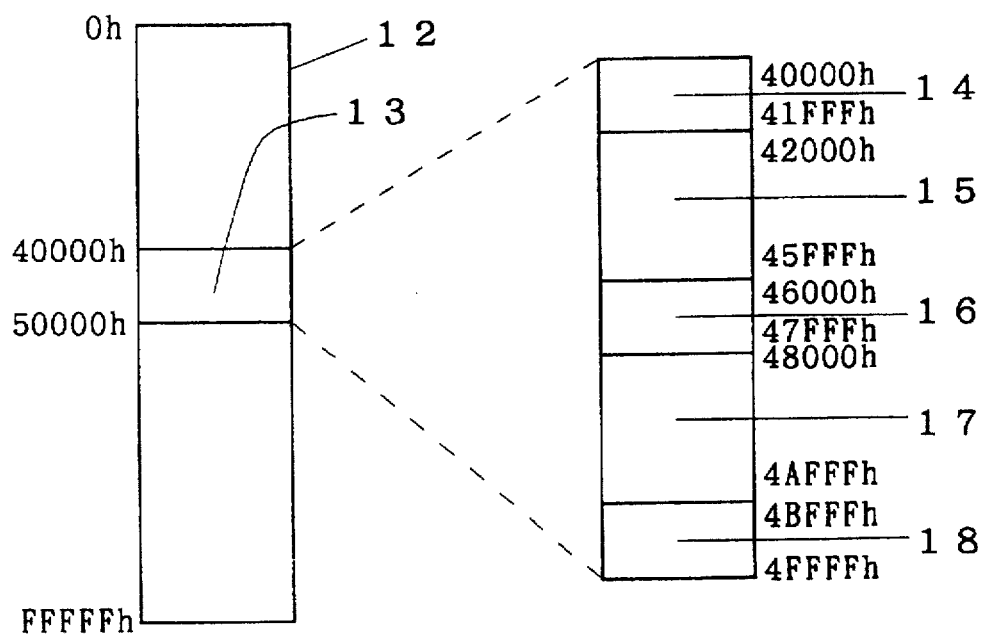
FIG. 2 is a diagram illustrating an address space 13.

FIG. 2 is a diagram illustrating an address space 12 of a host CPU 1 and an address space 13 to which the interface board 2a is assigned. The addresses of instructions outputted by the host CPU 1 are set in 0h-FFFFFh ("h" indicates that preceding numbers are hexadecimal). Among these instructions, addresses of instructions to the interface board 2a are set in the address space 13 (addresses 40000h–4FFFFh).

The instruction processing device 11 itself has a storage element, which is assigned to an address space 14 (addresses 40000h–41FFFh). The address space 13 to which the interface board 2a is assigned is larger than that, however, and the addresses 42000h–4FFFFh are further assigned to it.

The devices 6, 7, 8 all have registers for executing respective functions, where address spaces to which they are assigned are selected from the address space 13. Specifically, the devices 6, 7, 8 are respectively assigned to address spaces 15 (42000h–45FFFh), 16 (46000h–47FFFh) and 17 (48000h–4AFFFh) in the address space 13.

The host CPU 1 provides instructions corresponding to the address space 13 to the extension bus 3 to access the interface board 2a. The instruction processing device 11 receives an instruction provided to the extension bus 3, and if the instruction corresponds to the addresses 40000h–41FFFh, it processes the instruction by itself, and if it corresponds to the addresses 42000h–4FFFFh, it activates the board bus 4 to transmit the instruction to the board bus 4.

Accordingly, the address space 15 is used when making an access to the device 6 from the host CPU 1, the address space 16 is used when making an access to the device 7, the address space 17 is used when making an access to the device 8, and the address space 14 is used when making an access to the instruction processing device 11 itself, respectively.

Figure 3:
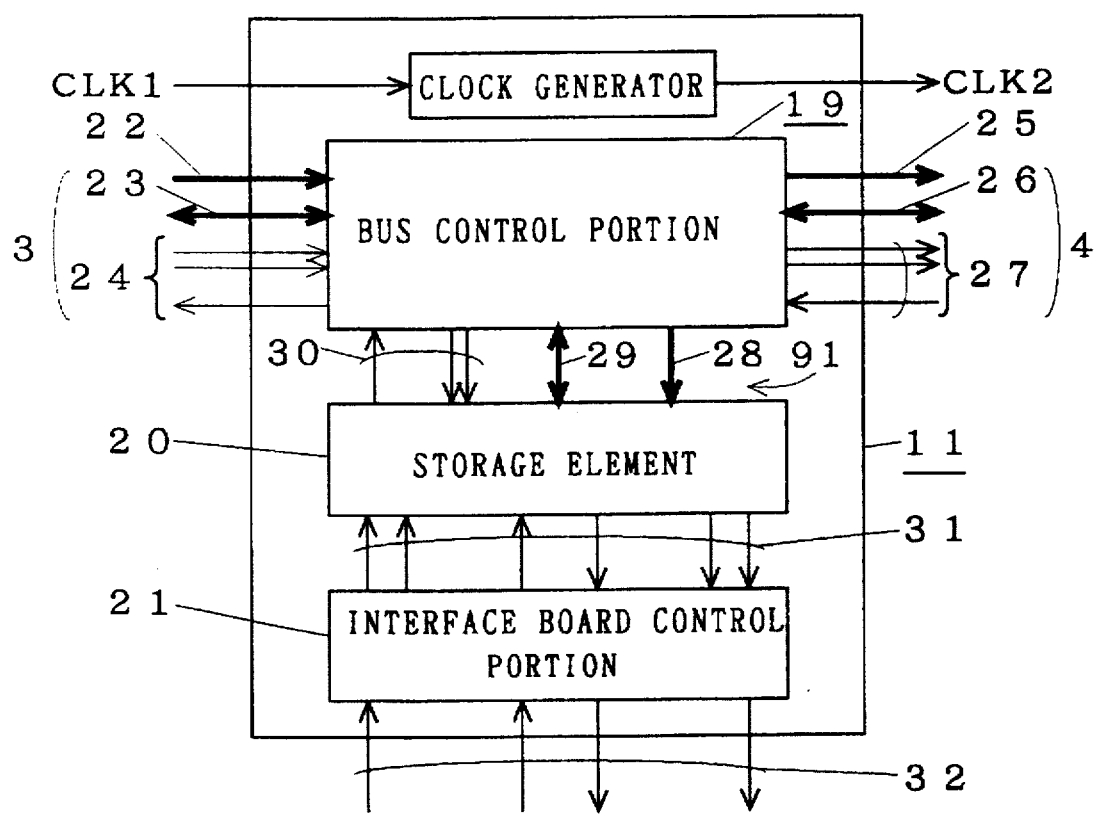
FIG. 3 is a block diagram illustrating the structure of the instruction processing device 11.

FIG. 3 is a block diagram illustrating the structure of the instruction processing device 11. The instruction processing device 11 includes a bus control portion 19, a storage element 20 and an interface board control portion 21. The bus control portion 19 terminates the extension bus 3 and analyzes groups of signals provided to the extension bus 3. Then, it activates the bus in the instruction processing device 11 or the board bus 4. The storage element 20, which is comprised of registers, RAM's, etc., is connected to the instruction processing device 11 through the bus control portion 19 and an internal bus 91. The interface board control portion 21 makes control to the interface board 2a according to contents read from the storage element 20. Now, objects of the control by the interface board control portion 21 are not the devices 6, 7, 8, but other devices which may be included in the interface board 2a, which may have such a function as display of ON/OFF of a power supply, for example.

Provided on the extension bus 3 are an address signal group 22, a data signal group 23 and a control signal group 24. Provided on the board bus 4 are an address signal group 25, a data signal group 26 and a control signal group 27. Provided on the internal bus 91 are an address signal group 28, a data signal group 29 and a control signal group 30.

A signal group 31 is used for transfer of control signals and data between the storage element 20 and the interface board control portion 21. The interface board control portion 21 uses a signal group 32 to control the interface board 2a.

The address signal group 22, the data signal group 23 and the control signal group 24 carried on the extension bus 3 are analyzed in the bus control portion 19.

If an instruction corresponds to the addresses 40000h–41FFFh, the internal bus 91 is activated and the address signal group 22, the data signal group 23 and the control signal group 24 are transmitted to the storage element 20 as the address signal group 28, the data signal group 29 and the control signal group 30, respectively. In response, the storage element 20 exchanges the signal group 31 with the interface board control portion 21 and provides results thereof to the bus control portion 19 as the data signal group 29 and the control signal group 30. Then, they are provided to the host CPU 1 shown in FIG. 1 through the extension bus 3 as the data signal group 23, the control signal group 24.

If the address to which an instruction corresponds is 42000h–4FFFFh, the board bus 4 is activated, and the address signal group 22, the data signal group 23 and the control signal group 24 are provided on the board bus 4 as the address signal group 25, the data signal group 26 and the control signal group 27, respectively. Then, these signals are transmitted to the devices 6, 7, 8 shown in FIG. 1. When the processing corresponding to that instruction is executed in a device (target) which is an object of the instruction, results thereof are provided on the board bus 4 as the data signal group 26, the control signal group 27. Then, they are provided on the extension bus 3 as the data signal group 23, the control signal group 24 through the bus control portion 19 and provided to the host CPU 1.

Figures 4, 5:
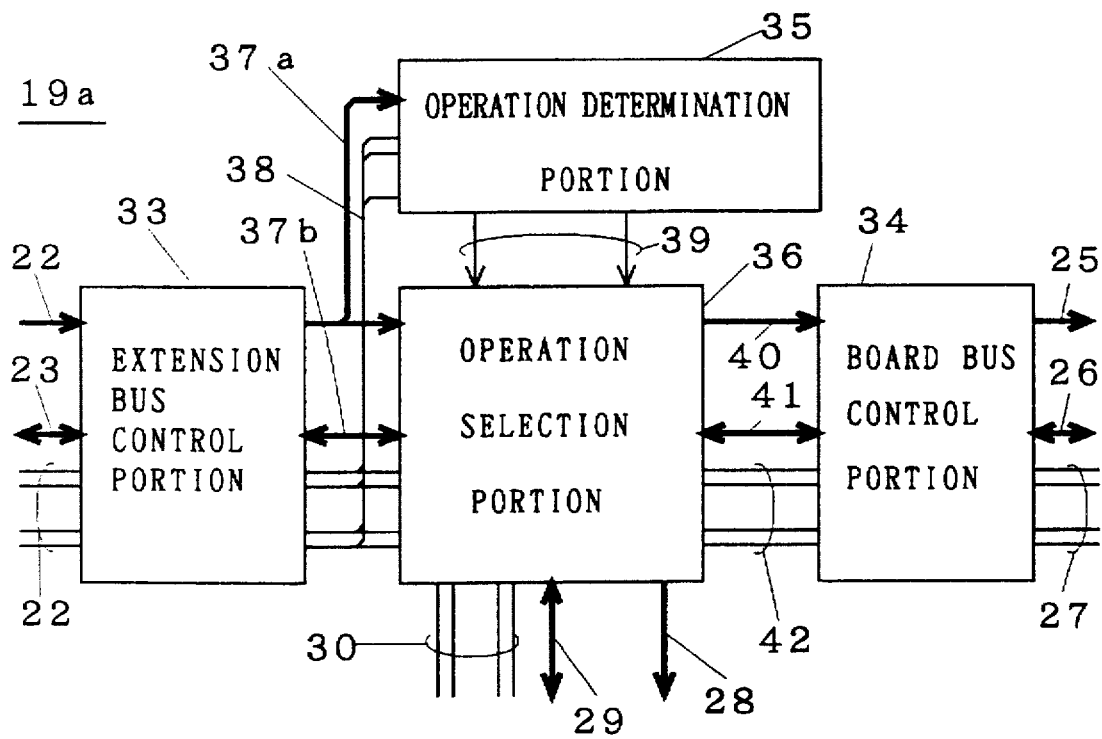

FIG. 4 is a block diagram showing an example of structure of the bus control portion 19a, where the bus control portion 19a can be used as the bus control portion 19 of FIG. 3. The bus control portion 19 includes an extension bus control portion 33, a board bus control portion 34, an operation determination portion 35 and an operation selection portion 36. The extension bus control portion 33 terminates the extension bus 3 and controls timing of signal transmission and the board bus control portion 34 terminates the board bus 4 and controls timing of signal transmission. The operation determination portion 35 analyzes signals of the extension bus 3 to determine operation, and the operation selection portion 36 actually selects operation according to the determination made by the operation determination portion 35.

The extension bus control portion 33 outputs the address signal group 22, the data signal group 23 and the control signal group 24 provided to the extension bus 3 as an address signal group 37a, a data signal group 37b and a control signal group 38, respectively. They are transmitted to the operation selection portion 36, and the address signal group 37a and part of the control signal group 24 (e.g. control signals of read/write, enable signals of devices) required to determine operation are transmitted to the operation determination portion 35, too.

In the operation determination portion 35, responses to the current access of the extension bus 3 are determined on the basis of the provided signal groups and they are transmitted to the operation selection portion 36 through a signal group 39. FIG. 5 is a diagram illustrating the contents of determination by the operation determination portion 35. The internal bus 91 is activated in the addresses 40000h–41FFFh, and the board bus 4 is activated in the addresses 42000h–4FFFFh, respectively. None of the buses are activated in other addresses 0h–3FFFFh and 50000h–FFFFFh.

The operation selection portion 36 selects operation according to the contents of the signal group 39. Referring to FIG. 5, one of the operations of activating the internal bus 91, activating the board bus 4 and activating none of the busses is selected. When activating the board bus 4, the address signal group 37a, the data signal group 37b and the control signal group 38 are outputted as an address signal group 40, a data signal group 41 and a control signal group 42, respectively. Then, the board bus control portion 34 outputs them as the address signal group 25, the data signal group 26 and the control signal group 27, respectively.

Next, the operation of the extension bus 3 and the board bus 4 will be described in examples of read/write.

Figure 6:
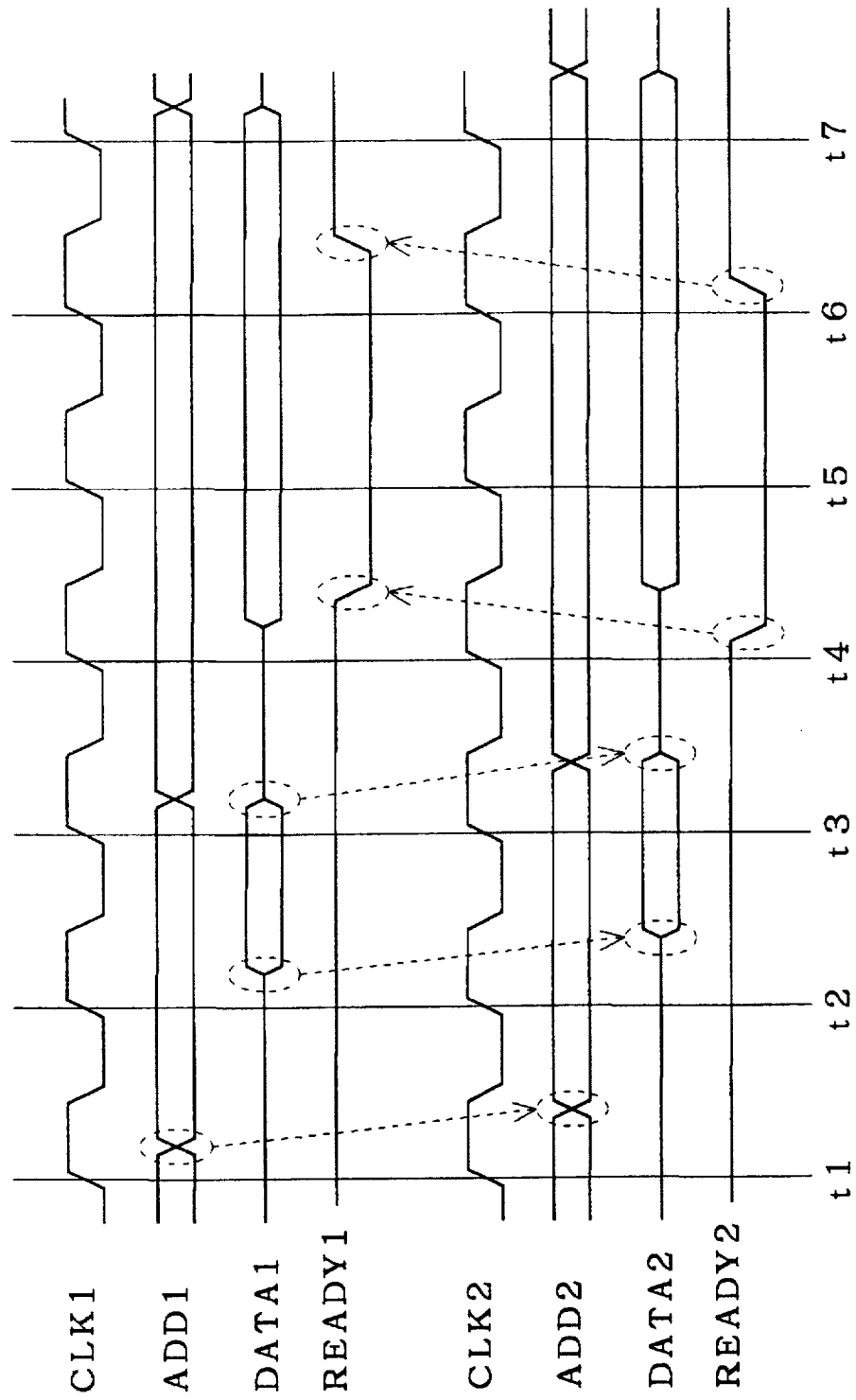
FIG. 6 is a timing chart showing the writing operation by the CPU 1 into a target.

FIG. 6 is a timing chart showing a writing operation by the host CPU 1 into a target (which the devices 6, 7, 8 may correspond to). The extension bus 3 is provided with a clock signal CLK1 and a clock generator for receiving it is provided in the instruction processing device 11 as shown in FIG. 3. The clock generator receives the clock signal CLK1 to generate a clock signal CLK2. The clock signal CLK2 makes transitions between binary values without being delayed from the clock signal CLK1 in the almost same phase. The clock generator can be formed of PLL circuitry.

The clock signals CLK1, CLK2 both rise at times t1–t7, the rise of which causes other signals to change.

FIG. 6 shows a signal ADD1 as the address signal group 22, a signal DATA1 as the data signal group 23, a signal READY1 as one of the control signal group 24 (other control signals, such as a write signal and a read signal, are not shown), a signal ADD2 as the address signal group 25, a signal DATA2 as the data signal group 26, and a signal READY2 as one of the control signal group 27 (others are not shown here), respectively. The signals READY1, READY2 are signals for indicating completion of an access to a target.

Triggered by a rise of the clock signal CLK1 at the time t1, the host CPU1 sends the address signal ADD1 and a write signal onto the extension bus 3 to start an access to the interface board 2a. These signals are driven (provided) onto the board bus 4 after operation determination and selection in the instruction processing device 11. With this operation, one of the devices on the interface board 2a is selected as a target.

The host CPU 1 drives the address signal ADD1 onto the extension bus 3 and then the instruction processing device 11 drives the address signal ADD2 corresponding to the address signal ADD1 onto the board bus 4. The address signal ADD2 is logically the same as the address signal ADD1, but it has some time lag.

Further, triggered by a rise of the clock signal CLK1 at the time t2, the host CPU 1 drives the data signal DATA1 onto the extension bus 3. On the basis of it, the data signal DATA2 is transmitted to the target. If the target can not respond to the access at this timing, however, the control signal READY2 becomes inactive and it is indicted that a preceding access is not completed. As it can respond to the access in the vicinity of the time t2, the control signal READY2 is kept activated ("H") at the time t3.

Therefore, at the time t3, the host CPU 1 recognizes that the preceding access has been completed and starts a new access. That is to say, it updates the value and drives the address signal ADD1 to the extension bus 3. Receiving the new access, the target can not immediately respond to the following accesses. Accordingly, triggered by a rise of the clock signal CLK2 at the time t4, the target inactivates ("L") the signal READY2. This signal is driven onto the extension bus 3 through the instruction processing device 11 as the signal READY1 and transmitted to the host CPU1 through the extension bus 3.

As the signal READY2 is inactive at both of the times t4 and t5, the host CPU1 can not complete the access and waits for completion by the target. However, it has already driven the data signal DATA1 newly onto the extension bus triggered by a rise of the clock signal CLK1 at the time t4. Accordingly, the data signal DATA2 is being newly driven onto the board bus 4 at the time t5.

After that, completing the access, the target activates the signal READY2 triggered by a rise of the clock signal CLK2 at the time t6. This activation is transmitted to the extension bus 3 as activation of the signal READY1 and transmitted to the host CPU1. Recognizing this, the host CPU1 can complete the access with a rise of the clock signal CLK1 at the time t7.

Figure 7:
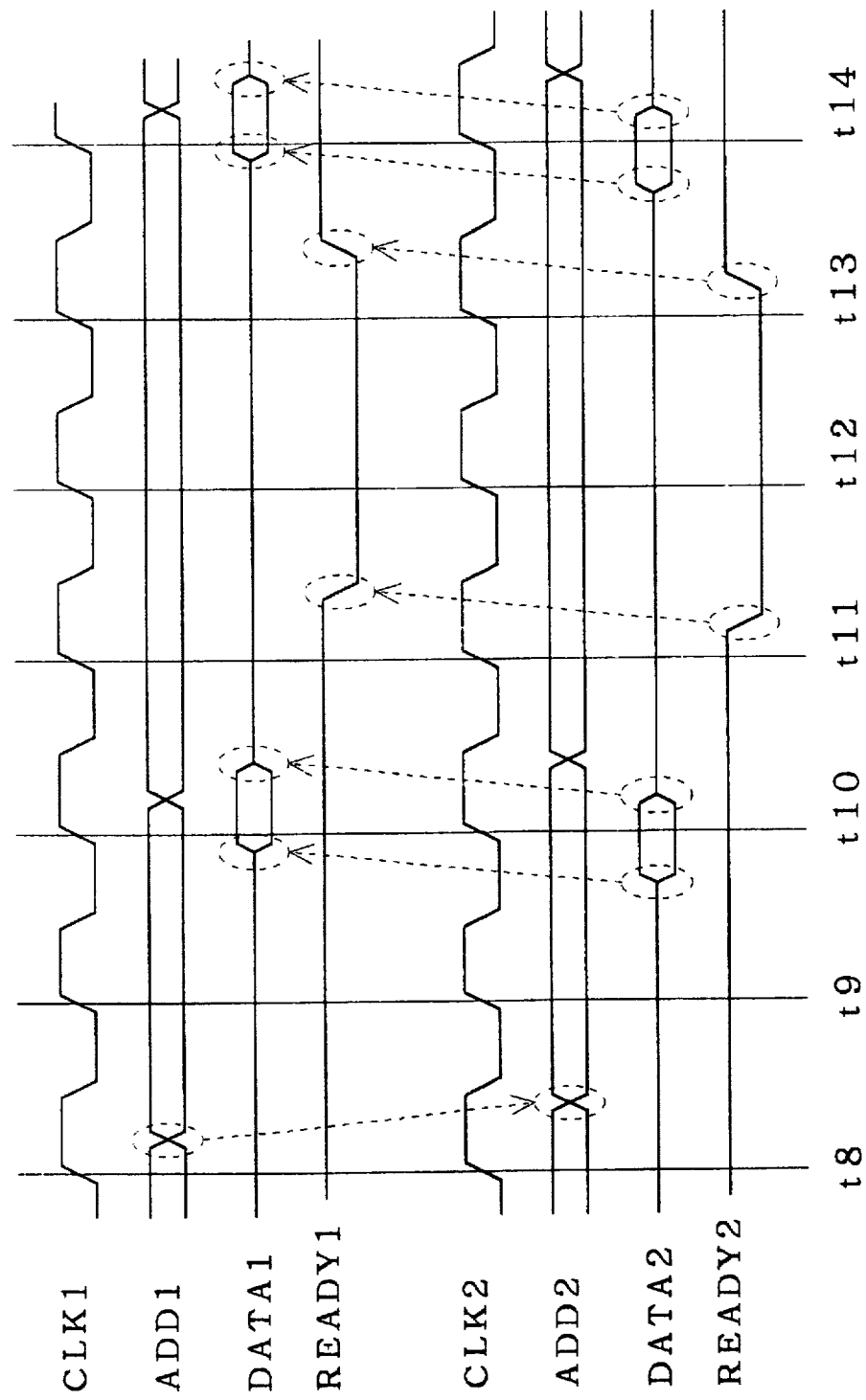
FIG. 7 is a timing chart describing the reading operation.

FIG. 7 is a timing chart describing a reading operation. Triggered by a rise of the clock signal CLK1 at the time 8, the host CPU1 sends the address signal ADD1 and a read signal onto the extension bus 3 to start an access to the interface board 2a. These signals are driven onto the board bus 4 after operation determination and selection by the instruction processing device 11. This operation selects one of the devices on the interface board 2a as a target.

The signal READY2 at the time t9 is active and the target accepts the access above. Then the signal DATA2 is driven onto the board bus 4. Though the signal DATA2 still exists on the board bus 4 at the time t10, an access is possible at the time t10 in the target. Hence, the control signal READY2 is active at the time t10, which is driven onto the extension bus 3 as the control signal READY1.

Recognizing this, the host CPU1 updates the value and newly drives the address signal ADD1 onto the extension bus 3. The value of the address signal ADD2 is thus also updated on the board bus 4. With this new access, the target can not immediately respond to an access further after, and it inactivates the control signal READY2 triggered by a rise of the clock signal CLK2 at the time t11.

At the time t12, an access can still not be made to the target, and the control signal READY2 is activated with a rise of the clock signal CLK2 at the time t13. Such a transition of the control signal READY2 is transmitted to the extension bus 3 through the instruction processing device 11 and recognized by the host CPU1 as the control signal READY1. The data signal DATA2 corresponding to the updated address signal ADD2 is read onto the board bus 4, which is also transmitted to the extension bus 3 as the data signal DATA1.

The host CPU1 updates the value of the address signal ADD1 triggered by a rise of the clock signal CLK1 at the time t14 on the basis of the recognition above.

Figure 8:
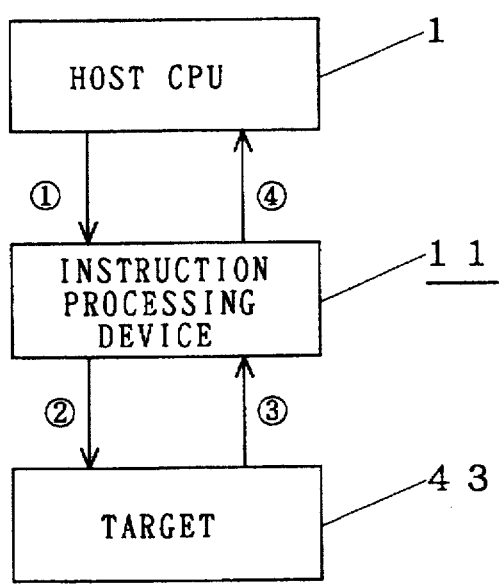
FIG. 8 is a schematic diagram describing the sequence of an access from the host CPU 1 to a target 43.

FIG. 8 is a schematic diagram describing a sequence of an access from the host CPU1 to a target 43. The target 43 is selected out of the devices 6, 7, 8 on the interface board 2a. In accordance with the write and read shown in FIG. 6 and FIG. 7, the processing is proceeded in the order of ①-④ to end one access. An instruction given to the target is sequentially processed without confusion.

As described above, according to the first preferred embodiment, an interface board of a large scale can be constructed without requiring a local CPU. Furthermore, by using the board bus 4, the extension bus 3 is not affected by data transfer within the interface board. Accordingly, an interface board can be made which causes no degradation in the performance of the entire system.

The instruction processing device 11 analyzes an address of an instruction which is received by itself and controls activation of the board bus 4 according as the instruction is to be processed by itself or to be processed by another device connected to the board bus 4, and therefore the interface board above can be constructed.

(b-2) Second Preferred Embodiment

Figure 9:
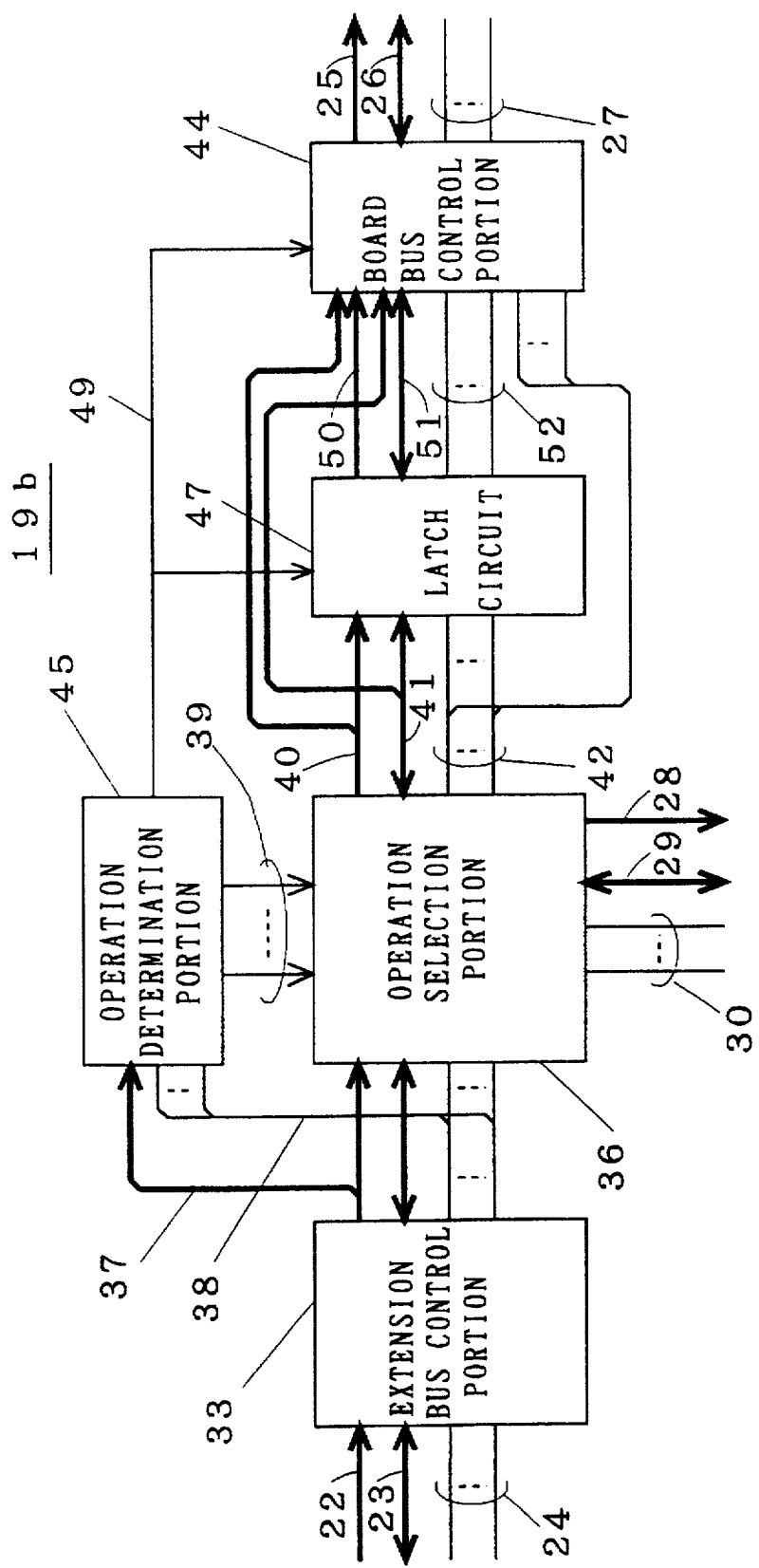
FIG. 9 is a block diagram showing the structure of a bus control portion 19b according to the second preferred embodiment of the present invention.

FIG. 9 is a block diagram showing the structure of a bus control portion 19b according to the second preferred embodiment of the present invention, and the bus control portion 19b can be used as the bus control portion 19 shown in FIG. 3.

The bus control portion 19b has the structure of the bus control portion 19a shown in the first preferred embodiment and a latch circuit 47 added thereto. However, in the structure thereof, the operation determination portion 35 is replaced by an operation determination portion 45 and the board bus control portion 34 is replaced by a board bus control portion 44 because the latch circuit 47 is added thereto. The operation determination portion 45 is different from the operation determination portion 35 in the point that it outputs a signal group 49. The board bus control portion 44 is different from the board bus control portion 34 in that it receives part of the signal group 49. The remainder of the signal group 49 is provided to the latch circuit 47.

The operation selection portion 36 outputs the address signal group 40, the data signal group 41 and the control signal group 42 under the same conditions as those shown in the first preferred embodiment. In the second preferred embodiment, however, these signal groups may be latched in the latch circuit 47.

If an instruction carried on the extension bus 3 is a write instruction, the operation determination portion 45 detects it and makes the latch circuit 47 operate through a part of the signal group 49. The operation determination portion 45 also uses the signal group 39 to instruct the operation selection portion 46 to immediately respond to the current access from the extension bus 3. In response to it, the operation selection portion 46 falsely responds to the extension bus 3 through the extension bus control portion 33 as if the access is completed from the target. Describing in conformity with the first preferred embodiment, it drives a false READY signal corresponding to the signal READY1 onto the extension bus 3.

The address signal group 40, the data signal group 41 and the control signal group 42 once latched in the latch circuit 47 are provided to the board bus control portion 44 respectively as an address signal group 50, a data signal group 51 and a control signal group 52 at an appropriate time after that, in conformity with the first preferred embodiment, at the time when the signal READY2 is activated. Then, the board bus control portion 44 drives the address signal group 50, the data signal group 51 and the control signal group 52 onto the board bus 4 respectively as the address signal group 25, the data signal group 26 and the control signal group 27 at a predetermined timing on the basis of part of the signal 49.

When the instruction processing device 11 receives a read instruction, the board bus control portion 44, on the basis of a part of the signal 49, drives the address signal group 40, the data signal group 41 and the control signal group 42 as the address signal group 25, the data signal group 26 and the control signal group 27, respectively. This is because it takes time to process if the address signal group 50, the data signal group 51 and the control signal group 52 which are latched by the latch circuit 47 are driven onto the board bus 4.

Figure 10:
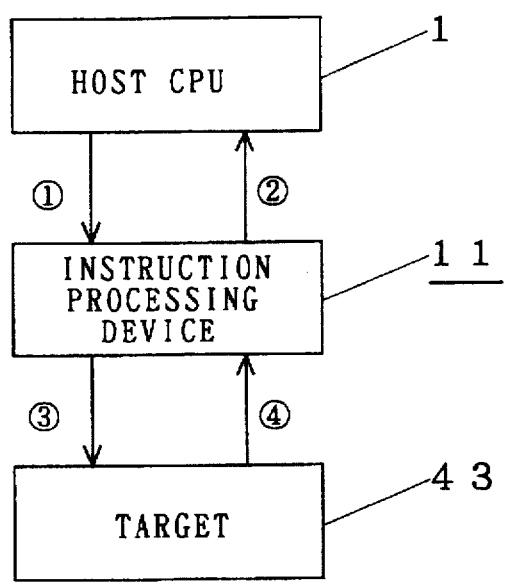
FIG. 10 is a schematic diagram describing the sequence of an access from the host CPU 1 to the target 43.

FIG. 10 is a schematic diagram describing a sequence of an access from the host CPU 1 to the target 43. The processing is proceeded in the order of ①-④ to complete one access. As can be clearly seen by comparing with FIG. 8, if an instruction provided to the instruction processing device 11 is of an write operation to the device on the board bus 4, it is possible to complete an access without waiting for operation on the board bus 4 for the extension bus 3 and the host CPU

(b-3) Third Preferred Embodiment

In the third preferred embodiment, a description will be made on the operation where other devices which function as masters for the board bus 4 exist besides the instruction processing device and bus arbitrating function means (bus arbiter) exists outside of the instruction processing device.

Figure 11:
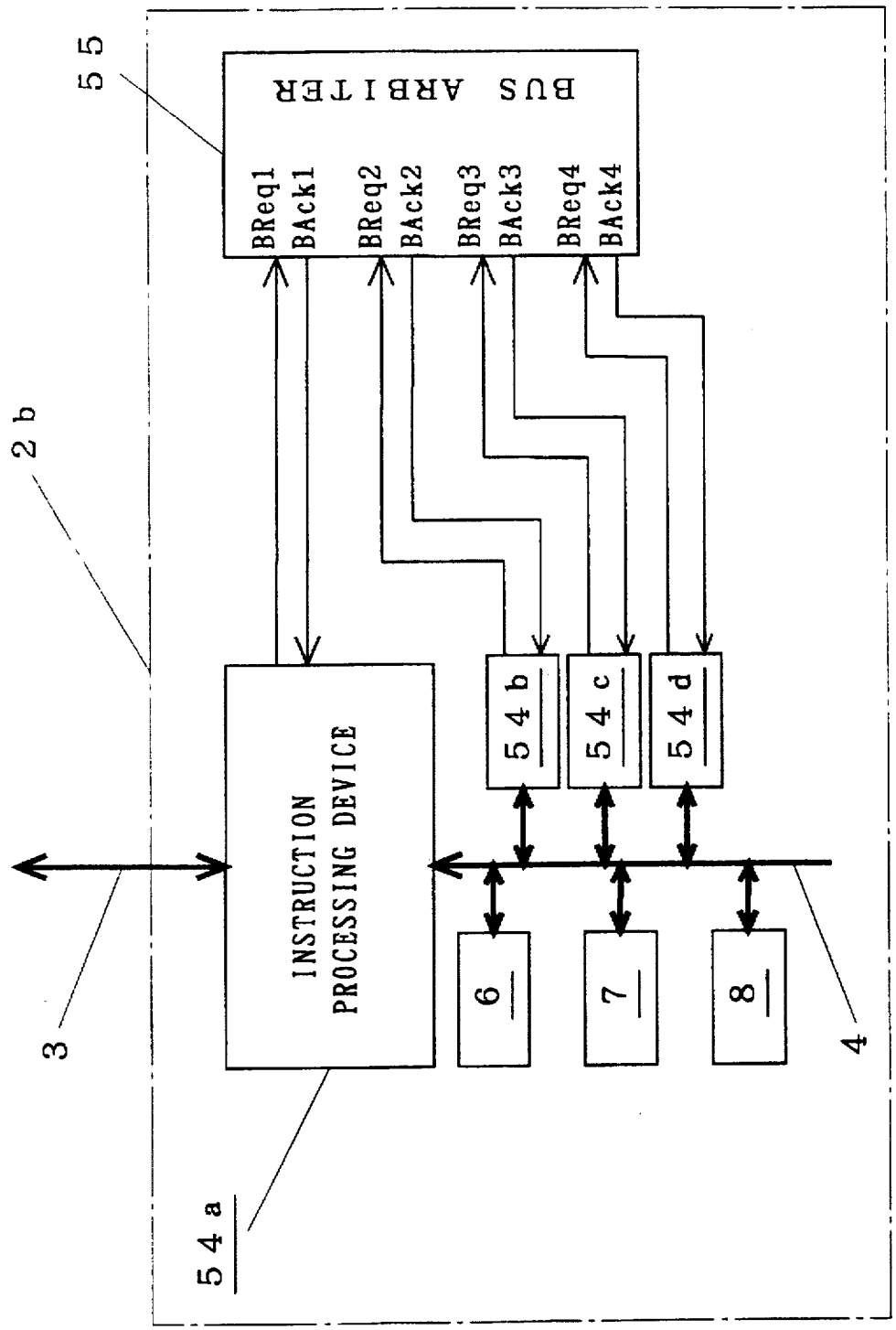
FIG. 11 is a block diagram showing the structure of an interface board 2b according to the third preferred embodiment of the present invention.

FIG. 11 is a block diagram showing structure of an interface board 2b according to the third preferred embodiment of the present invention. The interface board 2b includes an instruction processing device 54a having the same function as that of the instruction processing device 11 shown in the first and second preferred embodiments, a board bus 4, devices 6, 7, 8, 54b, 54c, 54d, and a bus arbiter 55. The interrelations among the instruction processing device 54a, the board bus 4 and the devices 6, 7, 8 are the same as those described in the first preferred embodiment.

The instruction processing device 54a, the devices 54b, 54c, 54d all function as masters for the board bus 4. They obtain a right to use the board bus 4 exclusively to one another. The assignment of the right to the use is made by the bus arbiter 55.

Signals BReq1, BReq2, BReq3, BReq4 are right-to-use request signals with which the instruction processing device 54a, the devices 54b, 54c, 54d request the right to use the board bus 4 for the bus arbiter 55, respectively. On the basis of these, the bus arbiter 55 provides response signals BAck1, BAck2, BAck3, BAck4 to the instruction processing device 54a, the devices 54b, 54c, 54d, respectively.

If only a single request is presented for the right to use the board bus 4, the bus arbiter 55 immediately gives the right to use the board bus 4 to that master. If a plurality of requests simultaneously occur, it permits the right to use the board bus 4 to the masters according to a predetermined algorithm, in order or according to the order of priority, for example. A master which obtains the right to use the board bus 4 makes an access to the board bus 4 and frees the board bus 4 when the access is completed.

When the instruction processing device 54a analyzes an access from the extension bus 3 and determines that that access is an access to a target existing on the board bus 4, if it currently has the right to use the bus (BAck=1), it completes the access from the extension bus 3 before freeing the board bus 4 and then frees the board bus 4 after the access is completed. If it did not obtain the right to use the board bus 4 (BAck=0), it places the access from the extension bus 3 in a wait state until it obtains the right to use the board bus 4.

As described above, according to the third preferred embodiment, accesses to the board bus 4 are possible even if a plurality of devices which function as masters for the board bus 4 exist on the interface board 2b.

It is a matter of course that the instruction processing device 54a may include the bus control portion 19b described in the second preferred embodiment to latch the instruction of the writing operation.

(b-4) Fourth Preferred Embodiment

In the fourth preferred embodiment, a description will be made on the operation where devices which function as masters for the board bus 4 exist besides the instruction processing device and the bus arbiter means exists within the instruction processing device.

Figure 12:
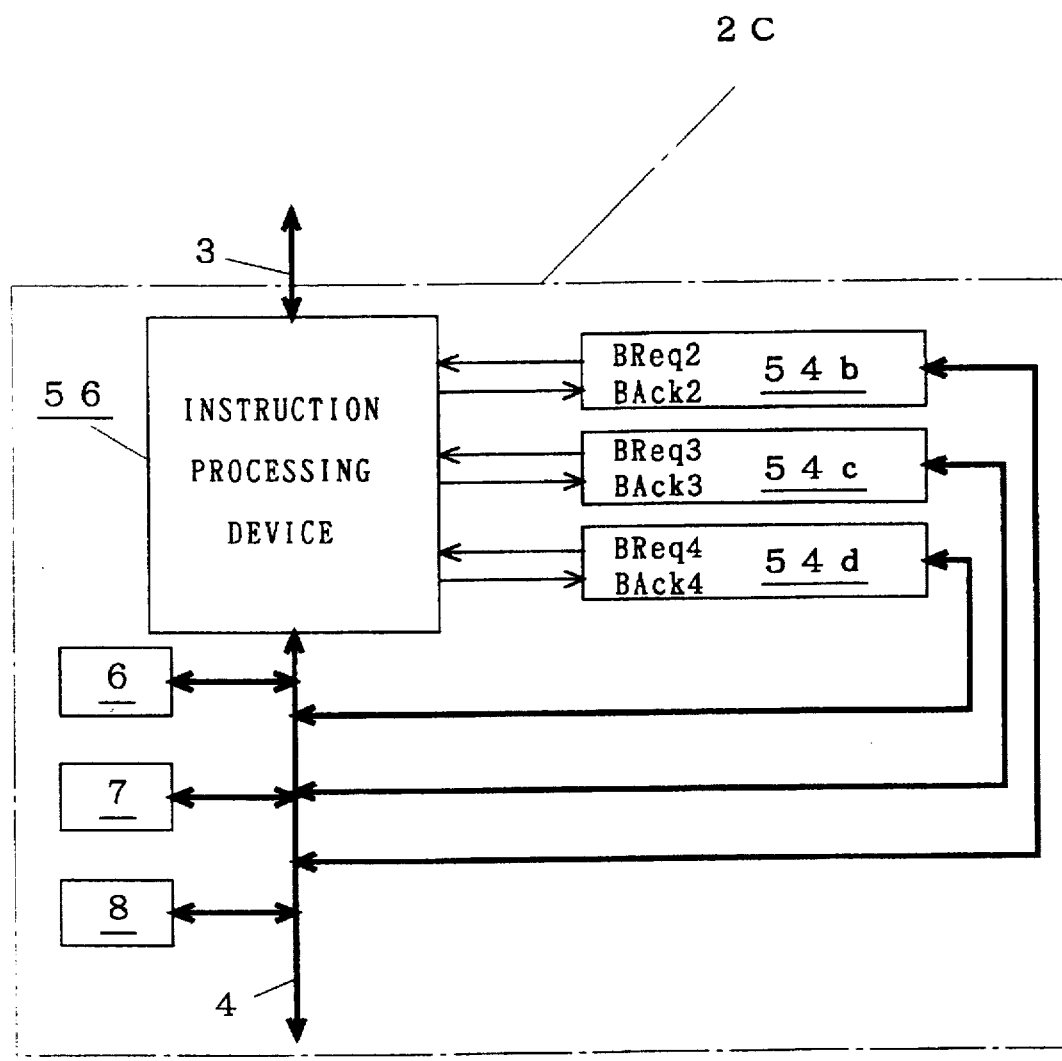
FIG. 12 is a block diagram showing the structure of an interface board 2c according to the fourth preferred embodiment of the present invention.

FIG. 12 is a block diagram showing structure of an interface board 2c according to the fourth preferred embodiment of the present invention. The interface board 2c includes an instruction processing device 56, a board bus 4, and devices 6, 7, 8, 54b, 54c, 54d. The instruction processing device 56 has the function of the bus arbiter 55 shown in the third preferred embodiment in addition to the functions the same as the instruction processing device 11 and the instruction processing device 54a shown in the first through third preferred embodiments.

When the devices 54b, 54c, 54d request the right to use the board bus 4, the right-to-use request signals BReq2, BReq3, BReq4 are outputted in the same way as the third preferred embodiment, respectively. These are provided to the instruction processing device 56. When the instruction processing device 56 itself works the function of the instruction processing device 11 upon the board bus 4, it arbitrates the right to use by itself.

That is to say, if only one request occurs, the instruction processing device 56 immediately gives the right to use the board bus 4 to that master including itself, and if a plurality of requests occur at the same time, it gives the right to use the board bus 4 according to predetermined algorithm, in order or according to the order of priority, for example. A master, which obtains the right to use the board bus 4, makes an access to the board bus 4 and then frees the board bus 4 when the access is completed.

The arbitrating function is effected when the instruction processing device 56 analyzes an access from the extension bus 3 and determines that that access is to a target existing on the board bus 4. If it possesses the right to use the board bus 4 without giving the right to the use to the devices 54b, 54c, 54d which are masters other than itself and a request is made from these devices for the right to use, it gives the right to use the board bus 4 to one of these devices after an access concerning itself is completed. If it has given the right to use the board bus 4 to one of the devices 54b, 54c, 54d, it places the access from the extension bus 3 into a wait state until that device frees the right to use the board bus 4.

Accordingly, the same effects as the third preferred embodiment can be obtained. Further, the instruction processing device 56 may include the bus control portion 19b described in the second preferred embodiment to latch instructions of the writing operation.

(b-5) Fifth Preferred Embodiment

In the fifth preferred embodiment, a description will be made on the technique about how the instruction processing device processes interrupts generated by the respective devices existing on the interface board and transmits them to the host CPU.

Figure 13:
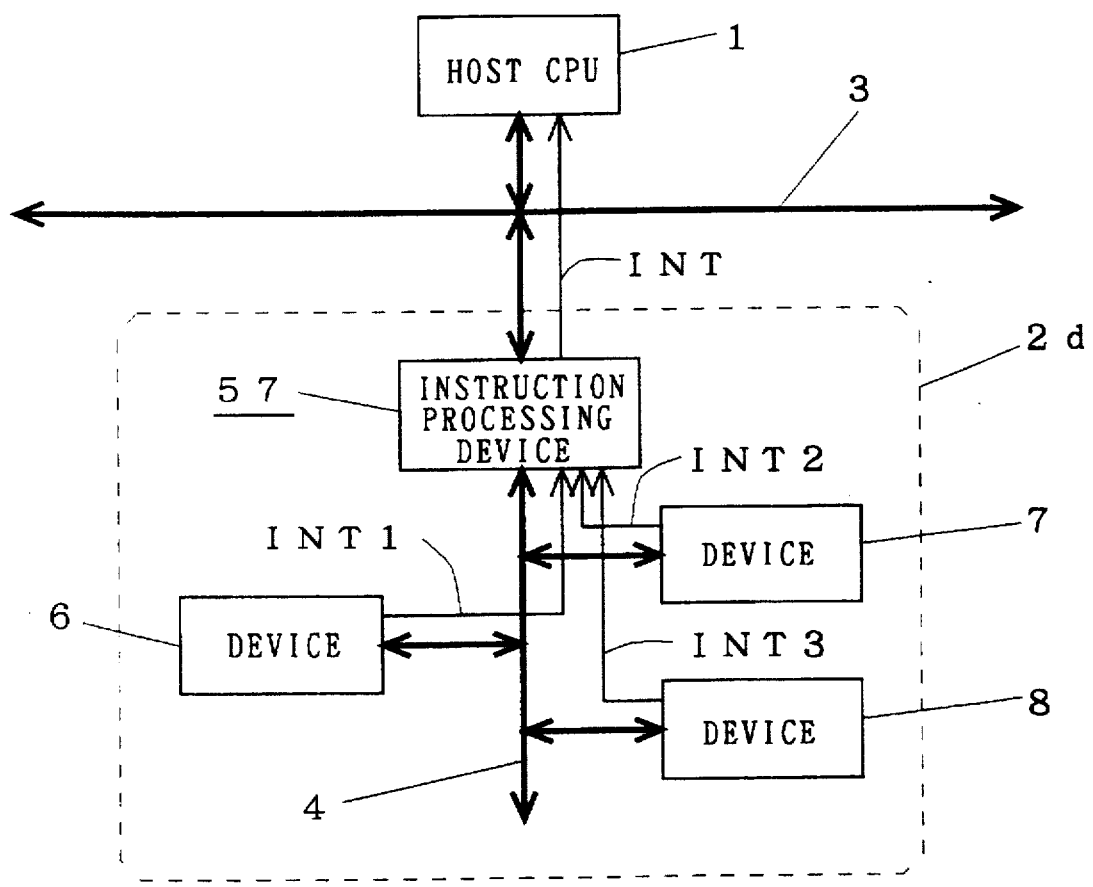
FIG. 13 is a block diagram showing the structure of an interface board 2d according to the fifth preferred embodiment of the present invention.

FIG. 13 is a block diagram showing the structure of an interface board 2d according to the fifth preferred embodiment of the present invention. The interface board 2d includes an instruction processing device 57 substituted for the instruction processing device 11 in the structure of the interface board 2a shown in the first preferred embodiment.

When an interrupt request occurs in the devices 6, 7, 8, interrupt request signals INT1, INT2, INT3 are respectively generated, which are provided to the instruction processing device 57. The instruction processing device 57 has a function of providing a board interrupt request signal INT on the extension bus 3 in addition to the functions of the instruction processing device 11. The instruction processing device 57 has at least one interrupt input terminal to be able to receive the interrupt request signals from the devices on the interface board 2d.

Figure 14:
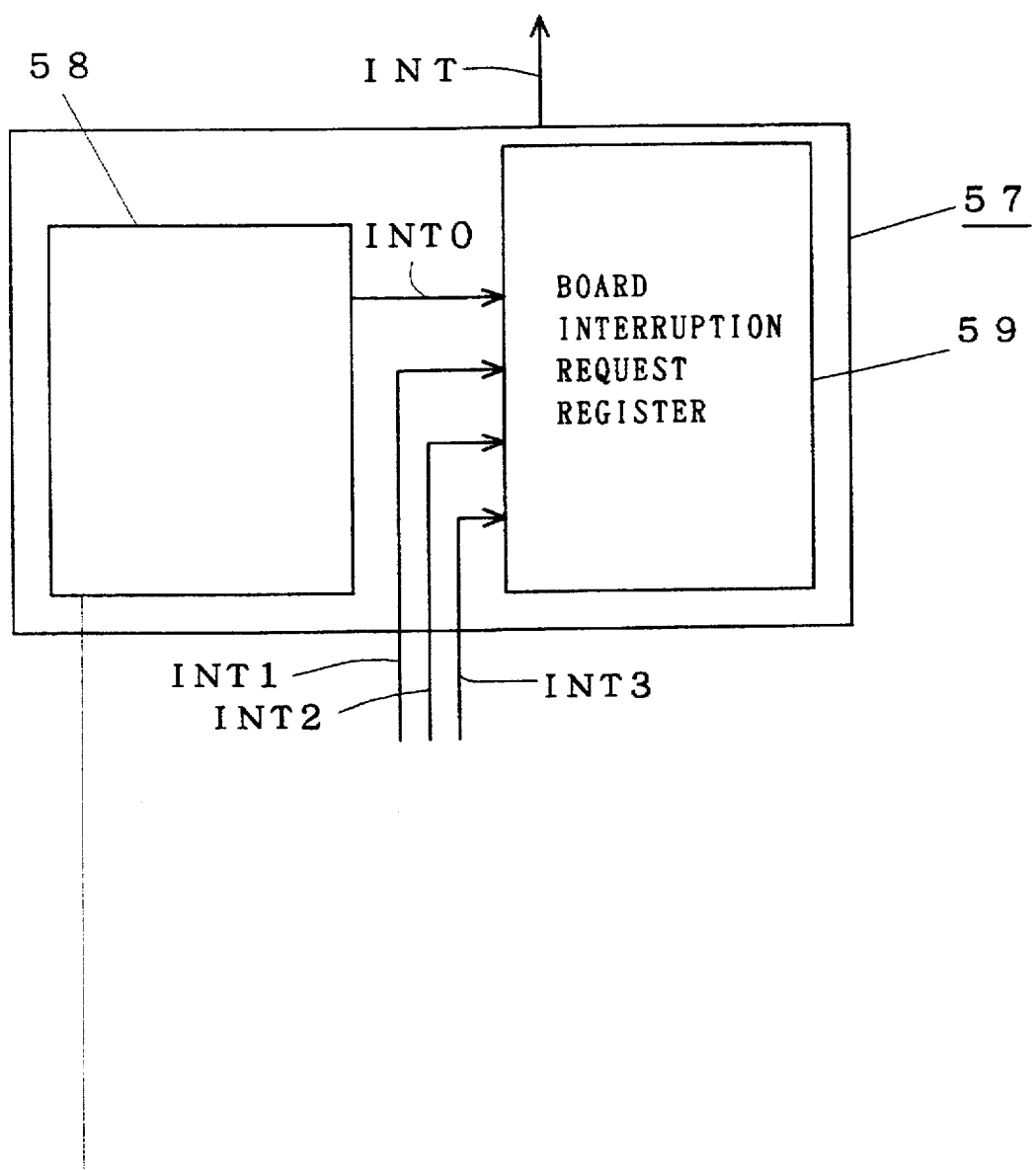
FIG. 14 is a block diagram illustrating the structure of the instruction processing device 57.

FIG. 14 is a block diagram illustrating the structure of the instruction processing device 57. The instruction processing device 57 includes a block 58 and a board interrupt request register 59. The block 58 is a block having a function equivalent to that of the instruction processing device 11, for example, and it also has a function of generating an interrupt signal INTO when an interrupt request occurs in itself.

The board interrupt request register 59 stores the interrupt request signals INT0-INT3, to which the host CPU 1 can make an access to read the contents. The interrupt request signal INT is generated as an OR of the interrupt request signals INT0-INT3. That is to say, if an interrupt request occurs in at least one of the block 58, the devices 6, 7, 8, the board interrupt request signal INT is activated.

Figure 15:
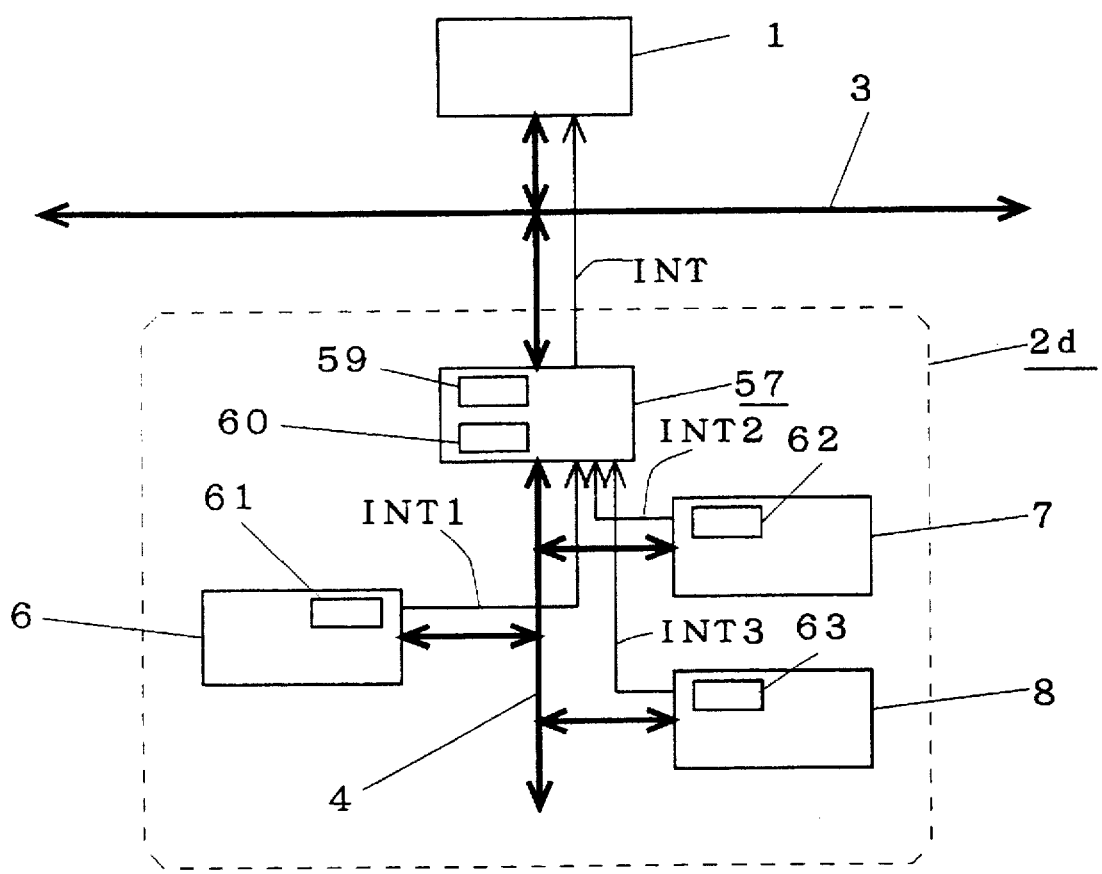
FIG. 15 is a block diagram illustrating another structure of the interface board 2d.

FIG. 15 is a block diagram illustrating another structure of the interface board 2d, where interrupt factor registers 60, 61, 62, 63 for indicating interrupt factors are added to the instruction processing device 57 and the respective devices 6, 7, 8, respectively.

Figure 16:
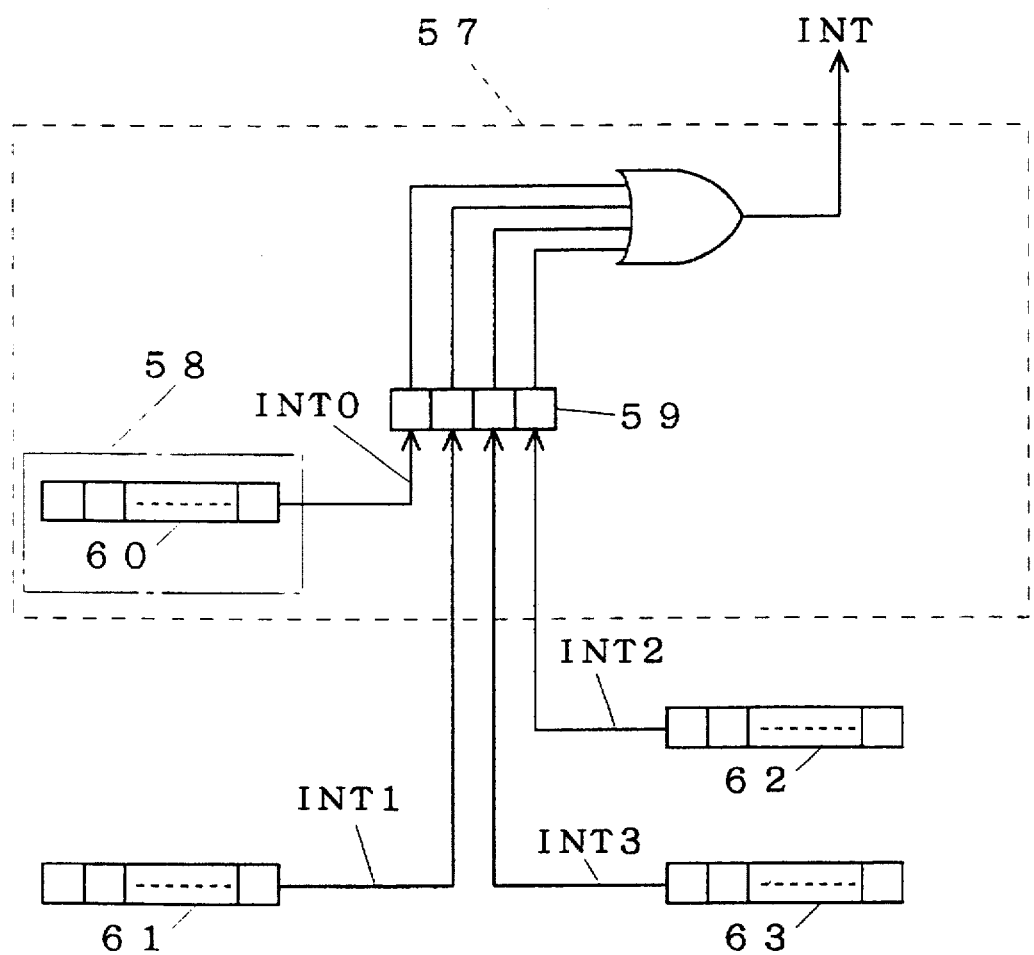
FIG. 16 is a circuit diagram showing connections between the interrupt factor registers 60–63 and the board interrupt request register 59.

FIG. 16 is a circuit diagram showing connections between the interrupt factor registers 60-63 and the board interrupt request register 59 in detail. The board interrupt request register 59 has a plurality of bits, each of the bits provided with the contents of the interrupt request signals INT0-INT3.

Furthermore, the interrupt factor registers 60-63 have a plurality of bits, in which the interrupt factors are stored.

Figure 17:
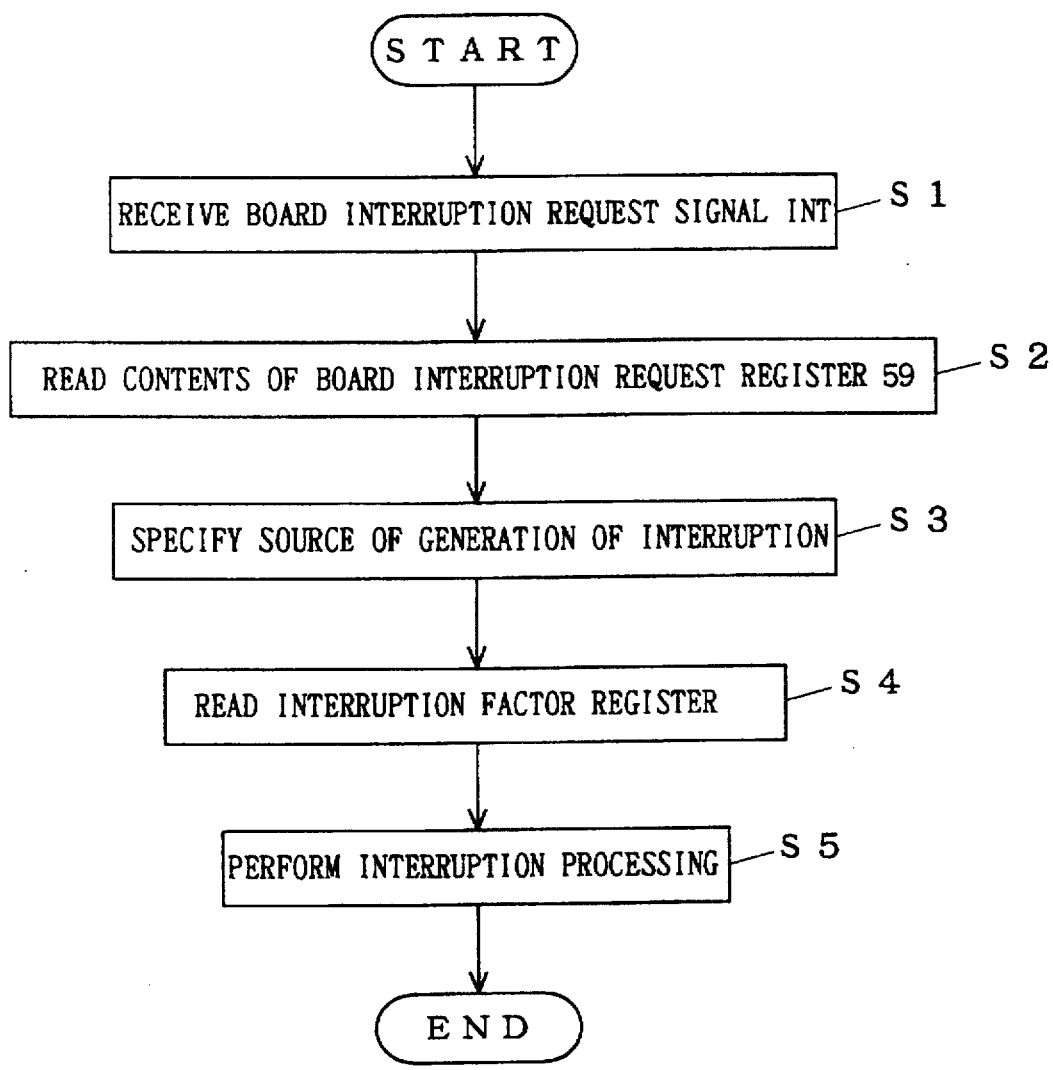
FIG. 17 is a flow chart showing a processing flow for processing an interrupt occurring in the interface board 2d.
Figure 18:
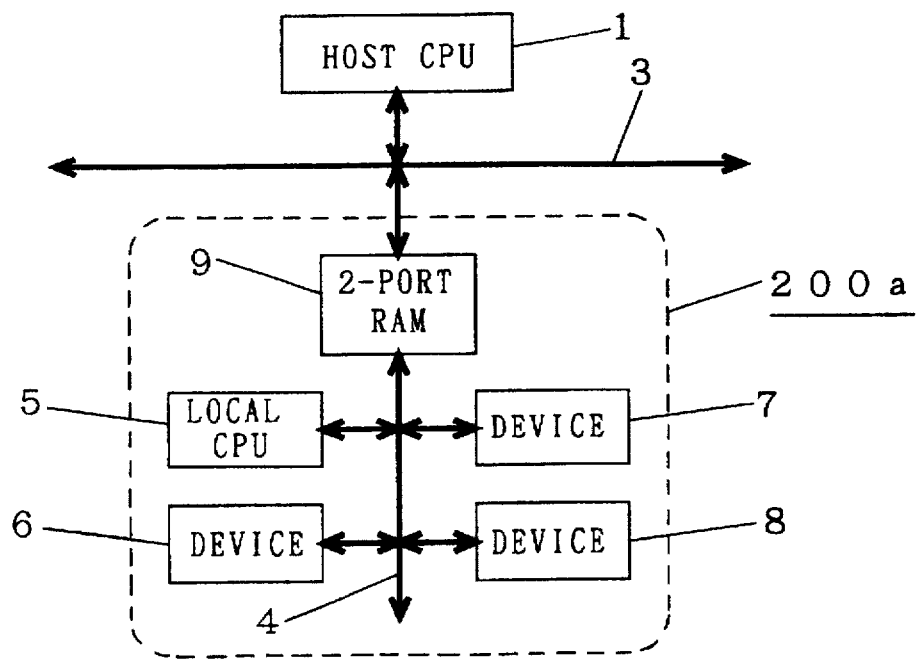
Figure 19:
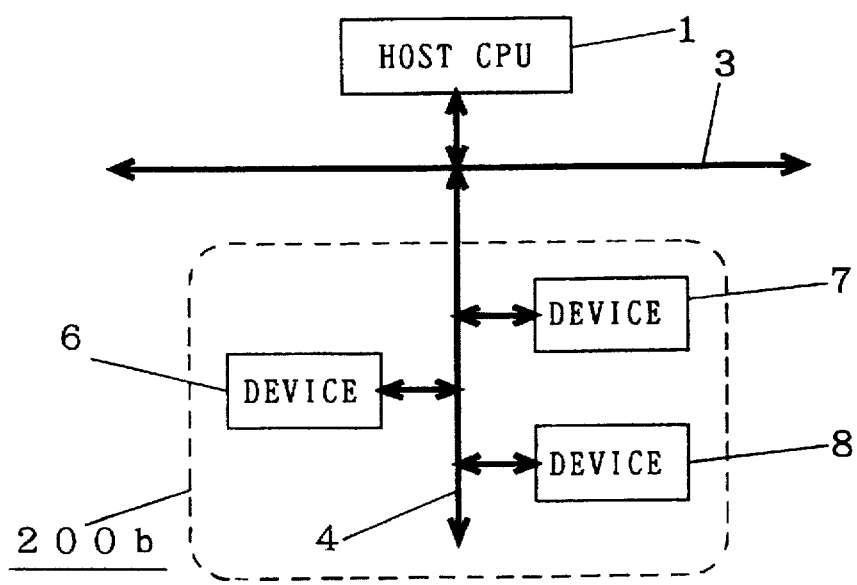
FIG. 19 is a block diagram showing the structure of another conventional interface board 200b.
Figure 2:
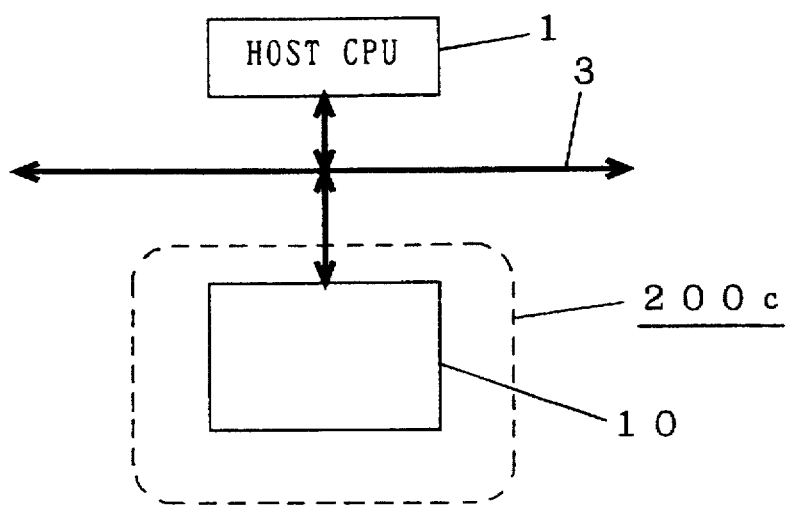

FIG. 17 is a flow chart showing a process flow for processing in the host CPU 1 an interrupt occurring in the interface board 2d. First, in the step S1, the host CPU 1 receives the board interrupt request signal INT. Then, it reads the contents of the board interrupt request register 59 (the step S2). It is known from the contents of the board interrupt request register 59 which of the interrupt request signals INT0-INT3 is activated. That is to say, at least one of the devices 6, 7, 8 or the instruction processing device 57 is specified as a source of generation of the interrupt (the step S3). To know a detailed interrupt factor, one of the interrupt factor registers 60-63 provided in the source of the interrupt is read (the step S4), and then processing corresponding to it is conducted (the step S5).

As has been described above, according to the fifth preferred embodiment, the interrupt processing from the host CPU 1 becomes possible when at least one device which generate an interrupt exist on the interface board 2d.

In the fifth preferred embodiment, mapping of the respective devices and the instruction processing device into the address space shown in FIG. 2 can be used. The board interrupt request register 59 and the interrupt factor register 60 are mapped in the addresses 40000h-41FFFh, the interrupt factor register 61 is mapped in the addresses 42000h-45FFFh, the interrupt factor register 62 is mapped in the addresses 46000h-47FFFh, and the interrupt factor register 63 is mapped in the addresses 48000h-4AFFFh, respectively, and the host CPU 1 uses these addresses to access the registers.

C. Examples of Applications (c-1) In the above-described preferred embodiments, the description has been made on the case where addresses and data are separated both in the extension bus 3 and the board bus 4. However, it is a matter of course that it is effective to apply the present invention to a bus with multiplexed addresses and data, which produces the same effects as the above-described preferred embodiments.

(c-2) In the second preferred embodiment, the case has been illustrated where the extension bus 3 and the board bus 4 both have clocks in the same phase and operation is made at rises thereof. However, the same effect can be obtained with configuration where the extension bus 3 operates at a rise of a clock and the board bus 4 operates at a fall of a clock, respectively.

(c-3) Furthermore, it is also possible to provide the instruction processing device with a function of absorbing the difference in clocks to independently set clocks for the extension bus 3 and the board bus 4 so that the operation timing of the interface board 2a can be set irrespective of the timing of the extension bus 3. This will produce the effect of increasing the flexibility in the manufacturing conditions of the interface board 2a.

While the invention has been described in detail, the foregoing description is in all aspects illustrative and not restrictive. It is understood that numerous other modifications and variations can be devised without departing from the scope of the invention.

I claim:

1. An interface board, comprising:
   (a) an instruction processing device connected to an extension bus and including
   (a-1) an input portion for inputting an instruction which is provided from said extension bus and corresponds to an address space including first and second portions,
   (a-2) an operation determination portion for determining to which of said first and second portions said instruction corresponds, and
   (a-3) an operation selection portion for processing said instruction when said instruction corresponds to said first portion and outputting said instruction when said instruction corresponds to said second portion;
   (b) at least one controlled element including a storage element to which said second portion is assigned, said at least one controlled element controlled based on said instruction corresponding to said second portion, and
   (c) a board bus which connects said at least one controlled element and said instruction processing device, wherein said instruction processing device functions as a master for said board bus.

2. The interface board according to claim 1, wherein
said at least one controlled element outputs to said board bus a READY signal for indicating whether or not an access to said storage element is completed,
said READY signal is transmitted to said extension bus through said operation selection portion, and
update of said instruction is conducted after said READY signal indicates completion of an access to said storage element.

3. The interface board according to claim 2, wherein said instruction comprises an instruction to write to said storage element.

4. The interface board according to claim 2, wherein said instruction comprises an instruction to read from said storage element.

5. The interface board according to claim 2, wherein said instruction processing device further comprises,
   (a-4) a latch circuit interposed between said operation selection portion and said board bus, said latch circuit latching said instruction corresponding to said second portion, said operation selection portion providing a false READY signal corresponding to said READY signal to said extension bus when said instruction is latched irrespective of a value taken by said READY signal outputted from said controlled element, and update of said instruction being conducted after said false READY signal indicates completion of an access to said storage element.

6. The interface board according to claim 1, wherein said instruction processing device further comprises, (a-4) an extension bus control portion interposed between said extension bus and both said operation determination portion and said operation selection portion, for receiving said instruction from said extension bus and providing it to said operation determination portion and said operation selection portion at a predetermined timing.

7. The interface board according to claim 6, wherein said instruction processing device further comprises, (a-5) a board bus control portion interposed between said board bus and said operation selection portion, for receiving said instruction corresponding to said second portion from said operation selection portion and providing said instruction to said board bus at a predetermined timing.

8. The interface board according to claim 1, further comprising at least a second controlled element, and wherein said second portion is divided and assigned to each corresponding storage element of said at least one and at least said second controlled elements.

9. The interface board according to claim 1, further comprising;

(d) at least one master means which functions as a master together with said instruction processing device to said board bus, and (e) arbitrating means for arbitrating which of said instruction processing device and said master means is permitted to use said board bus.

10. The interface board according to claim 1, further comprising, (d) at least one master means which functions as a master together with said instruction processing device to said board bus, and said instruction processing device having a function of arbitrating which of said master means and said instruction processing device is permitted to use said board bus.

11. An instruction processing device, comprising:

(a) an input portion for inputting an instruction corresponding to an address space having first and second portions, (b) an operation determination portion for determining to which of said first and second portions said instruction corresponds, and (c) an operation selection portion for processing said instruction when said instruction corresponds to said first portion and outputting said instruction when said instruction corresponds to said second portion.

12. The instruction processing device according to claim 11, wherein said instruction processing device is connected to a board bus to which at least one controlled element is connected, and operation of said at least one controlled element is controlled with an instruction corresponding to said second portion through said instruction processing device, said instruction processing device further comprising at least one master means which functions as a master to said board bus, and arbitrating means for arbitrating which of said master means and said instruction processing device is permitted to use said board bus.

13. The instruction processing device according to claim 12, wherein said instruction processing device is also connected to an extension bus on which said instruction is provided, said at least one controlled element generates an interrupt request signal and provides said interrupt request signal to said instruction processing device, and said instruction processing device further comprises (d) interrupt request means for generating a board interrupt request signal on the basis of said interrupt request signal and providing said board interrupt request signal to said extension bus.

14. The interface board according to claim 1, wherein said at least one controlled element generates an interrupt request signal and provides said interrupt request signal to said instruction processing device, and said instruction processing device further comprises (a-4) interrupt request means for generating a board interrupt request signal based on said interrupt request signal and providing said board interrupt request signal to said extension bus.

15. The interface board according to claim 14, wherein said interrupt request means generates said board interrupt request signal based on an interrupt request signal generated by said instruction processing device.

16. The interface board according to claim 14, wherein said at least one controlled element has (b-1) an interrupt factor register for storing an interrupt factor, and said interrupt request signal is generated based on a contents of said interrupt factor register.

* * * * *